US006628616B2

(12) United States Patent
Licht

(10) Patent No.: US 6,628,616 B2
(45) Date of Patent: *Sep. 30, 2003

(54) FRAME RELAY NETWORK FEATURING FRAME RELAY NODES WITH CONTROLLED OVERSUBSCRIBED BANDWIDTH TRUNKS

(75) Inventor: Robert C. Licht, Manassas, VA (US)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,989

(22) Filed: Jan. 26, 1999

(65) Prior Publication Data

US 2002/0181397 A1 Dec. 5, 2002

Related U.S. Application Data

(60) Provisional application No. 60/073,139, filed on Jan. 30, 1998.

(51) Int. Cl.[7] .......................... H04L 12/50; H04L 12/54
(52) U.S. Cl. .................. 370/232; 370/230; 370/251; 370/233; 370/235; 370/236; 370/357; 370/389; 370/400; 709/223; 709/227
(58) Field of Search .......................... 370/229, 230, 370/230.1, 231, 232, 233, 235, 236, 351, 352, 357, 389, 400; 709/223, 224, 225, 226, 227, 228, 229

(56) References Cited

U.S. PATENT DOCUMENTS

| | | | |
|---|---|---|---|
| 5,029,164 A | | 7/1991 | Goldstein et al. |
| 5,491,694 A | | 2/1996 | Oliver et al. |
| 5,521,909 A | * | 5/1996 | Holloway et al. .............. 370/54 |
| 5,940,373 A | * | 8/1999 | Chiu et al. .................... 370/238 |
| 5,999,524 A | * | 12/1999 | Corbalis et al. ............. 370/352 |
| 6,028,858 A | * | 2/2000 | Rivers et al. ................ 370/352 |
| 6,075,771 A | * | 6/2000 | Wolff et al. .................. 370/232 |
| 6,185,189 B1 | * | 2/2001 | Brassier et al. ............. 370/236 |
| 6,370,116 B1 | * | 4/2002 | Giroux et al. ............... 370/232 |

OTHER PUBLICATIONS

J. N. Daigle, "General Networking Concepts", The Electrical Engineering Handbook, pp. 1448–1451, by CRC Press, Inc., 1993.
Martin de Prycker, "System concept progress", Asynchronous Transfer Mode: Solution For Broadband ISDN, Second Edition, Chapter 1, Section 1.3.2, pp. 21–23, Ellis Horwood Limited 1993.
Martin de Prycker, "Packet switching", A synchronous Transfer Mode: Solution For Broadband ISDN, Second Edition, Chapter 2, Section 2.4.4., pp. 56–58, Ellis Horwood Limited 1993.

(List continued on next page.)

*Primary Examiner*—Hassan Kizou
*Assistant Examiner*—Joe Logsdon
(74) *Attorney, Agent, or Firm*—Ware, Fressola, Van der Sluys & Adolphson; David A. Cordeiro

(57) ABSTRACT

A frame relay network has a network management system in combination with frame relay nodes. The network management system provides frame relay oversubscription trunk and connection parameter signals to the frame relay nodes. The network management system uses a graphical user software interface program for receiving frame relay oversubscription trunk and connection parameters from a network supervisor that are formatted into the frame relay oversubscription trunk and connection parameter signals. The frame relay nodes respond to the frame relay oversubscription trunk and connection parameter signals, and at least one frame relay node provides a frame relay oversubscription connection control signal containing connect level parameters to another frame relay node when relaying communication signals from one frame relay node to another frame relay node. In operation, the trunk line has multiple virtual connections communicating the frame relay oversubscribed data between the frame relay nodes.

17 Claims, 3 Drawing Sheets

OTHER PUBLICATIONS

Martin de Prycker, "The ATM Adaptation Layer", Asynchronous Transfer Mode: Solution For Broadband ISDN, Second Edition, Chapter 3, Section 3.7, pp. 128–130, Ellis Horwood Limited 1993.

Martin de Prycker, "ATM In the Access Network", Asynchronous Transfer Mode: Solution For Broadband ISDN, Second Edition, Chapter 8, Section 8.3, pp. 313–315, Ellis Horwood Limited 1993.

Robert G. Winch, "Data Transmission and the Future Network", Telecommunication Transmission Systems, Chapter 9, pp. 443–448, McGraw–Hill, Inc., 1993.

Robert G. Winch, "Broadband ISDN", Telecommunication Transmission Systems, Chapter 9, Section 9.6.2., pp. 487–500, McGraw–Hill, Inc., 1993.

* cited by examiner

FRAME RELAY NETWORK

TYPICAL FRAME RELAY NODE

FRAME RELAY NETWORK FEATURING FRAME RELAY NODES WITH CONTROLLED OVERSUBSCRIBED BANDWIDTH TRUNKS

This application claims the benefit of U.S. provisional application No. 60/073,139, filed Jan. 30, 1998.

BACKGROUND OF THE INVENTION

1. Technical Field

This invention relates to a network; and more particularly relates to a frame relay network having frame relay nodes connected by trunk lines.

2. Description of Related Art

In the prior art, Frame Relay standards define two categories of traffic subscription for data entering a frame relay network. One is committed data and the other is excess data. A Frame Relay traffic network must allocate sufficient bandwidth on a trunk line connecting frame relay nodes to meet various obligations for carrying subscribers' committed and excess data. The goal is to maximize the utilization of the total bandwidth of each trunk line in the Frame Relay traffic network.

For a subscriber call having committed data, a common approach is to fully allocate bandwidth equal to a maximum burst rate of the subscriber call. Bandwidth so allocated for committed data is allocated exclusively for that particular subscriber call. This guarantees that the bandwidth is available whenever the subscriber call provides data at the maximum burst rate. For every call subscribing to committed data, a new separate bandwidth is allocated on the trunks as the call sets up.

However, one disadvantage of the prior art frame relay system is that in many networks a large number of frame relay calls which subscribe do not send data constantly at the maximum burst rate. Thus, the trunk bandwidth allocated for that subscriber call goes unused many times.

SUMMARY OF THE INVENTION

The basic idea of the present invention is to share the same bandwidth with multiple subscribers at a time by selectively oversubscribing the total bandwidth of a trunk line connecting frame relay nodes.

The present invention features a frame relay network having a network management system in combination with frame relay nodes.

The network management system provides frame relay oversubscription trunk and connection parameter signals to the frame relay nodes, which contain information about how to allocate the bandwidth of the trunk lines connecting the frame relay nodes. The network management system uses a graphical user interface program for receiving frame relay oversubscription trunk and connection parameters from a network supervisor that are formatted into the frame relay oversubscription trunk and connection parameter signals.

The frame relay nodes respond to the frame relay oversubscription trunk and connection parameter signals, for providing a frame relay oversubscription connection control signal from one frame relay node to another frame relay node depending on the frame relay oversubscription trunk and connection parameter signals.

Each frame relay node includes a node control board, one or more frame relay line interface boards, and a control bus for connecting the node control board to the one or more frame relay line interface boards. The one or more frame relay line interface boards may include either a frame relay low speed line interface board, a frame relay medium speed line interface board, a frame relay high speed line interface board, or a combination thereof.

The network management system, the node control board and the frame relay line interface board may comprise microprocessor-based circuitry for running respective software programs to implement the oversubscription scheme. The microprocessor-based circuitry has a combination of a microprocessor, a random access memory, a read only memory, an input/output device, and an address, control and data bus for connecting the combination.

The frame relay node can provide monitoring information signals back to the network management system that contain information about the current levels of data traffic for the exclusive committed data maximum burst signal, the shared committed data maximum burst signal, the excess committed data maximum burst signal, the total committed burst signal, or the combination thereof. The network supervisor may change the frame relay oversubscription trunk and connection parameters from time-to-time depending on the performance of the frame relay network as well as any feedback gained from the monitoring information.

One advantage of the present invention is that the benefit of oversubscription is that a customer needs fewer lines, cards, etc. to comprise the frame relay network.

A DESCRIPTION OF THE DRAWING

For a fuller understanding of the nature of the invention, reference should be made to the following detailed descriptions taken in connection with the accompanying drawings, not in scale, in which.

DETAILED DESCRIPTION OF THE INVENTION

Figure 1:
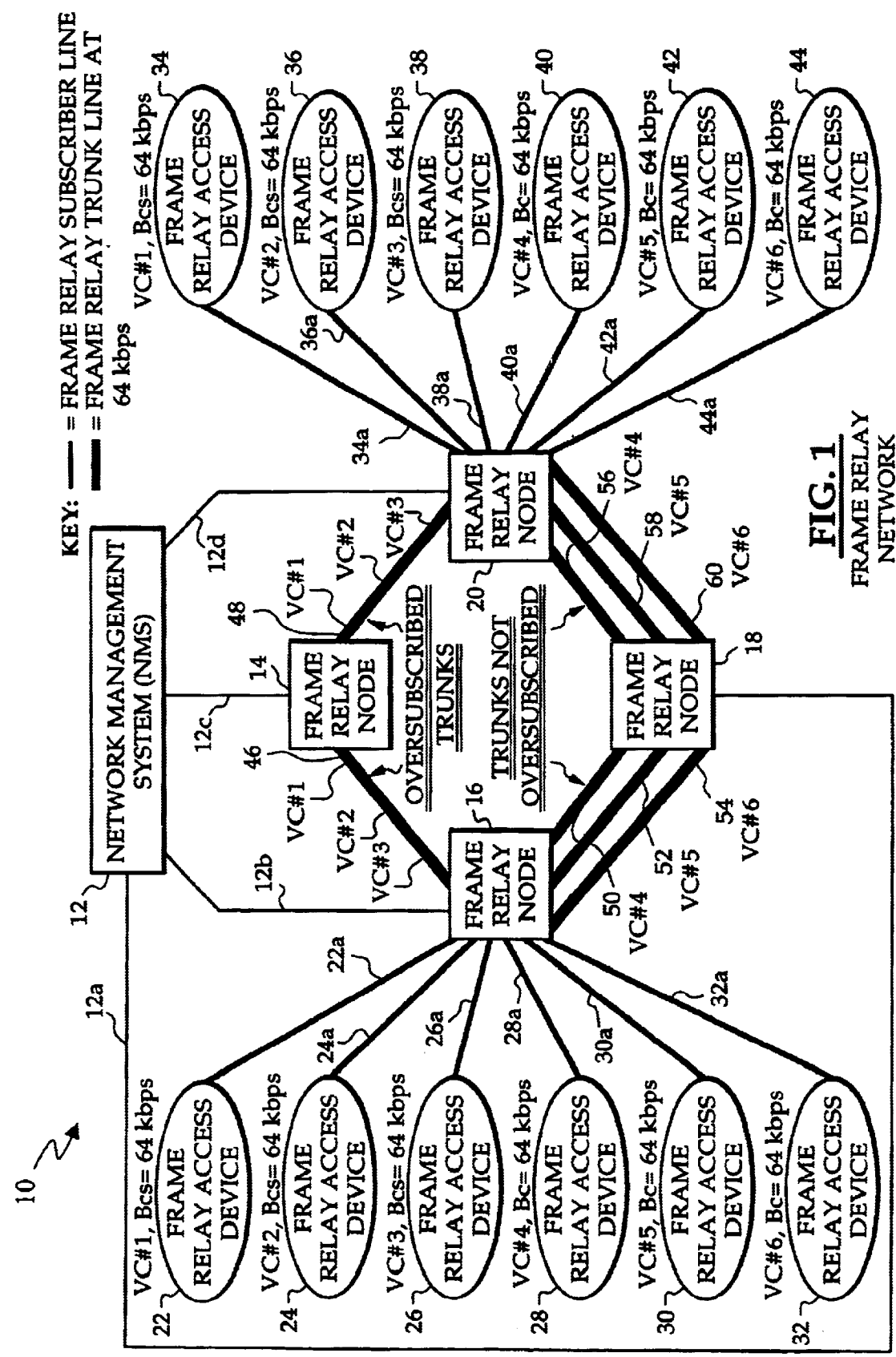
FIG. 1 is a block diagram of a sample frame relay network that is the subject matter of the present invention.
Figure 2:
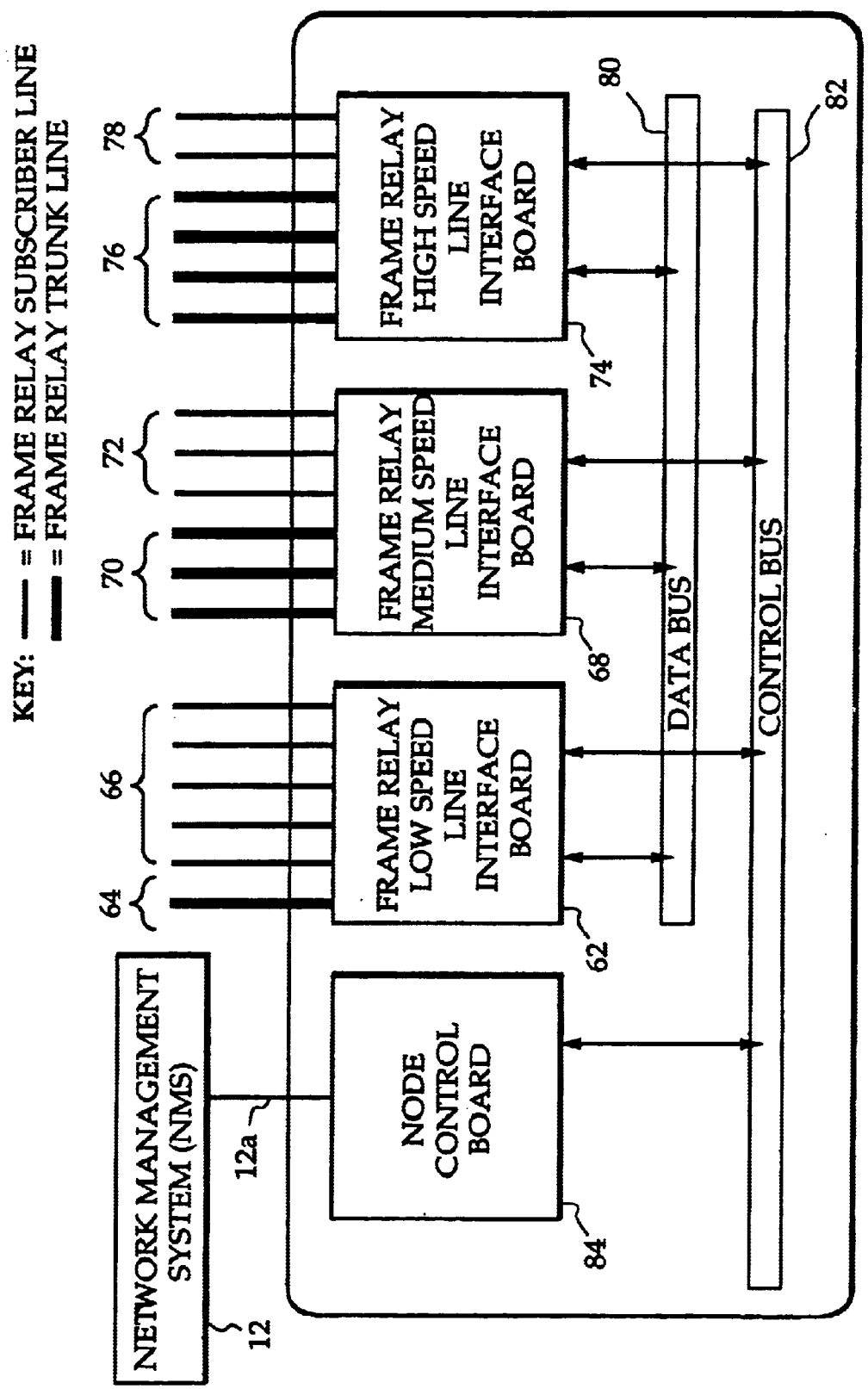
FIG. 2 is a block diagram of a typical frame relay node of the frame relay network shown in FIG. 1.
Figure 3:
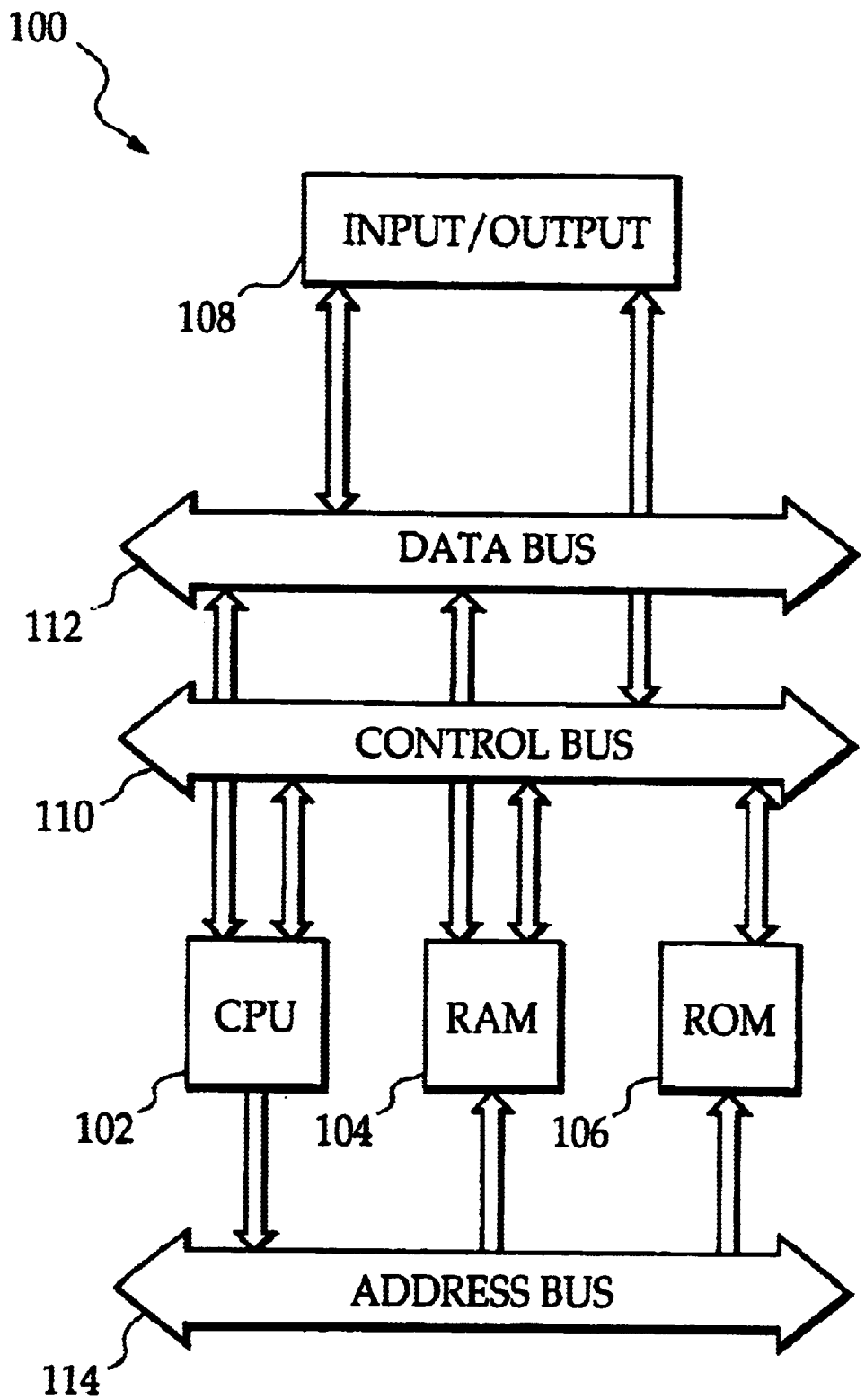
FIG. 3 shows a block diagram of a typical microprocessor circuit.

The Structure of the Frame Relay Network in FIGS. 1–3

FIG. 1 shows a frame relay network generally indicated as 10 that includes a network management system (NMS) 12 connected to frame relay nodes 14, 16, 18, 20 via network management system control lines 12a, 12b, 12c, 12d. As shown, the frame relay nodes 14, 16; 14, 20 are connected via trunk lines 46, 48 that are oversubscribed; and the frame relay nodes 18, 16; 18, 20 are connected via trunk lines 50, 52, 54, 56, 58, 60 that are not oversubscribed.

The Network Management System (NMS) 12

In operation, the network management system 12 provides frame relay oversubscription trunk parameter and connection signals to the frame relay nodes 14, 16, 18, 20 via the network management system control lines 12a, 12b, 12c, 12d. The frame relay oversubscription trunk and connection parameter signals contain information about how to allocate the total bandwidth of trunk lines connecting one or more of the frame relay nodes, including trunk parameter information about either a bandwidth allocation threshold, a user statistically committed data bandwidth threshold, a network statistically committed data bandwidth threshold, an excess data bandwidth threshold, an oversubscribed user statistically committed data factor, an oversubscribed network statistically committed data factor, an oversubscribed excess data factor, or any combination thereof. The frame relay oversubscription trunk and connection parameter signals also contain information about the bandwidth needs of individual virtual connections between the frame relay nodes, including connection parameter information about either an exclusive committed data maximum burst amount, a shared committed data maximum burst amount, an excess committed data maximum burst amount, a total committed burst rate, or any combination thereof. In one embodiment, trunk parameters from the frame relay oversubscription trunk parameter and connection signals are provided to all frame relay end nodes 14, 16, 18, 20, while connection parameters from the frame relay oversubscription trunk parameter and connection signals are provided to frame relay end nodes 16 and 20. The reader is referred to sections 5.1, 5.1.1, . . . , 5.1.7 below for greater detail about the trunk parameters, and sections 5.2, 5.2.1, . . . , 5.2.5 below for greater detail about the connection parameters.

The network management system 12 uses a graphical user interface program for receiving frame relay oversubscription trunk parameters from the network supervisor that are formatted into the frame relay oversubscription trunk and connection parameter signals. The network supervisor may change the frame relay oversubscription trunk parameters from time-to-time depending on the performance of the frame relay network as well as any feedback gained from frame relay node monitoring information; thus changing the configuration of which trunk lines 46, 48, 50, 52, 54, 56, 58, 60 are oversubscribed, and which are not oversubscribed, and to what degree.

The network nodes 14, 16, 18, 20 provide a monitoring information signal to the network management system 12, including information on current trunk bandwidth utilization.

The network management system 12 may comprise microprocessor-based circuitry 100 generally shown in FIG. 3 for running the graphical user software program to implement an oversubscription scheme. The microprocessor-based circuitry 100 has a combination of a central processor (microprocessor) 102, a random access memory 104, a read only memory 106, an input/output device 108 and an address, control and data bus generally indicated as 110, 112, 114 for connecting the combination. The microprocessor-based circuitry in FIG. 3 is shown by way of example, and the scope of the invention is not intended to be limited to any particular configuration of microprocessor-based circuitry. The scope of the invention is not intended to be limited any particular implementation of the network management system 12 or the combination of hardware and software to effect such an implementation. In view of more detailed design parameters set forth below, a person skilled in the art could implement the network management system 12 using a combination of hardware and software.

The Frame Relay Nodes 14, 16, 18, 20

In operation, the frame relay nodes 14, 16, 18, 20 respond to the frame relay oversubscription trunk and connection parameter signals from the network management system 12 via the network management system control lines 12a, 12b, 12c, 12d, for providing a frame relay oversubscription connection control signal from one frame relay node to another frame relay node depending on information contained in the frame relay oversubscription trunk and connection parameter signals. The frame relay oversubscription connection control signal contains information about the bandwidth needs of individual virtual connections (discussed below) between the frame relay nodes 14, 16, 18, 20, and may include a committed data parameter, an excess data parameter, a statistically committed data parameter, or a combination thereof. The committed data parameter has information about an exclusive committed data maximum burst amount. The excess data parameter has information about an excess committed data maximum burst amount. The statistically committed data parameter has information about a shared committed data maximum burst amount. The frame relay oversubscription connection control signal also has information about a total committed burst rate, which is a total of the exclusive committed data maximum burst amount and the shared committed data maximum burst amount per second. The reader is referred to sections 5.2, 5.2.1, . . . , 5.2.5 below for greater detail.

The frame relay node 16 is connected to frame relay access devices 22, 24, . . . , 32 via frame relay subscriber lines 22a, 24a, . . . , 32a, which are shown having a data rate of 64 kilo bits per second (kbps). Similarly, the frame relay node 20 is connected to frame relay access devices 34, 36, . . . , 44 via frame relay subscriber lines 34a, 36a, . . . , 44a, which are shown having a data rate of 64 kilobits per second (kbps). The frame relay node 14 is connected to frame relay nodes 16, 20 by the oversubscribed trunk lines 46, 48, which are shown having a data rate of 64 kbps. Because the trunk lines 46, 48 are oversubscribed, they each have multiple virtual connections VC#1, VC#2, VC#3. The frame relay node 18 is connected to frame relay nodes 16, 20 by the trunk lines 50, 52, 54, 56, 58, 60 which are shown having a data rate of 64 kbps and that are not oversubscribed. Because they are not oversubscribed, they can carry only one call per trunk line in this case. The trunk lines 50, 56 each carry a respective virtual connection VC#4; the trunk lines 52, 58 each carry a respective virtual connection VC#5; and the trunk lines 54, 60 each carry a respective virtual connection VC#6.

As shown, the frame relay access devices 22, 24, 26 communicate with the frame relay access devices 34, 36, 38 respectively. The frame relay access devices 22, 24, 26 communicate with the frame relay node 16 via respective frame relay subscriber lines 22a, 24a, 26a, then to the frame relay node 14 via the virtual connections VC#1, VC#2, VC#3 on the trunk line 46 that is oversubscribed, then to the frame relay node 20 via the virtual connections VC#1, VC#2, VC#3 on the trunk line 48 that is oversubscribed. Finally, the frame relay node 20 communicates with the frame relay access devices 34, 36, 38 via respective frame relay subscriber lines 34a, 36a, 38a. The frame relay access devices 34, 36, 38 communicate with the frame relay access devices 22, 24, 26 respectively following a reverse path.

In comparison, the frame relay access devices 28, 30, 32 communicate with the frame relay access devices 40, 42, 44 respectively. The frame relay access devices 28, 30, 32 communicate with the frame relay node 16 via the respective frame relay subscriber lines 28a, 30a, 32a, then to the frame relay node 18 via the respective virtual connections VC#4, VC#5, VC#6 on the respective trunk lines 50, 52, 54 that are not oversubscribed, then to the frame relay node 20 via the respective virtual connections VC#4, VC#5, VC#6 on the respective trunk lines 56, 58, 60 that are not oversubscribed. Finally, the frame relay node 20 communicates with the frame relay access devices 40, 42, 44 via the respective frame relay subscriber lines 40a, 42a, 44a. The frame relay access devices 40, 42, 44 communicate with the frame relay access devices 28, 30, 32 respectively following a reverse path.

FIG. 2 shows a typical frame relay node such as node 18 that includes a node control board 84, a frame relay low speed line interface board 62 having a low speed trunk 64 and five low speed access lines 66, a frame relay medium speed line interface board 68 having three medium speed trunks 70 and three medium speed access lines 72, a frame relay high speed line interface board 74 having four high speed trunks 76 and two high speed access lines 78, a data bus 80 for connecting the frame relay low, medium, high speed line interface boards 62, 68, 74, and a control bus 82 for connecting the frame relay low, medium, high speed line interface boards 62, 68, 74 to the node control board 84.

The network management system 12 provides various oversubscription trunk and connection parameters to the node control board 84 of the frame relay nodes 14, 16, 18, 20, which provide the same to the frame relay low, medium, high speed line interface boards 62, 68, 74. The frame relay low, medium, high speed line interface boards 62, 68, 74 have software routines for oversubscribing the trunks depending on the oversubscription trunk and connection parameters, which allocate bandwidth to committed data, statistically committed data and excess data for user and network calls.

The frame relay low, medium, high speed line interface boards 62, 68, 74 provide various current trunk utilization values to the node control board 84 of the frame relay nodes 14, 16, 18, 20, which provide the same information to the network management system 12. The network management system 12 has software routines for displaying this information to the network supervisor for network monitoring purposes.

The Oversubscription Technique

1. Oversubscription Technique in General

The present invention provides a frame relay network that enables customers to selectively oversubscribe their Frame Relay trunk line bandwidth for transferring committed data. That is, the network supervisor can use a part of trunk bandwidth for two or more subscribers rather than dedicating that bandwidth to only a single user.

In operation, when the frame relay network 10 in FIG. 1 accepts a subscription for committed data, it commits to transporting and delivering that data to a destination. Like any guarantee, however, there is still some small probability that the data the network committed to carry is actually not delivered, for example, due to network congestion during node outages. For each frame relay permanent virtual connection, the maximum amount of committed data must be specified. This maximum amount is called a committed burst. The committed burst amount taken over some limited time period defines the throughput rate for committed data, or committed information rate (CIR).

The excess data is data that the network will attempt to carry. The excess data is transported whenever possible, depending on current network resource availability. The network is not configured to guarantee to the subscriber the delivery of this data. If need be, the network may discard the excess data to use resources for the committed data. Because the network resource availability is so dynamic, the probability of discarding excess data may be high or low. Just how high the probability of discard is for excess data varies among networks, but it is surely higher than the probability of loss for committed data. For each Frame Relay permanent virtual connection, the maximum amount of the excess data must be specified. This maximum amount is called an excess burst. (Note that any data exceeding the agreed excess burst will automatically be discarded by the network.)

All permanent virtual connections must give some indication of their traffic. It is acceptable for a permanent virtual connection to be configured for having no committed data. Such a virtual connection is termed a "zero CIR" call. Virtual connections having some committed data are referred to as "non-zero CIR" or "positive CIR" calls. If a call has no committed data then its data must be all excess data. Therefore, these zero CIR calls must be configured to have some (non-zero) excess data. It is acceptable for a non-zero CIR call to be configured for no (zero) or some (non-zero) excess data.

As data enters the network, the data is recognized as being within the range of committed or excess data. Any data which exceeds those subscribed capacities is immediately discarded by the network upon entry.

The frame relay network is configured to allocate sufficient bandwidth on the trunk lines to meet its obligations for carrying subscribers' committed and excess data.

Since the frame relay network is considered fully expendable, it allocates only some fraction of the total bandwidth of the trunk line for excess data traffic. In effect, excess data "sneaks" through the network by "stealing" unallocated bandwidth or bandwidth that is allocated but is not being currently used. Allocation of bandwidth for excess data is not affected by the oversubscription feature of the present invention.

For a call which subscribes to having committed data, a common approach is to fully allocate bandwidth equal to the maximum burst amount. Bandwidth so allocated for committed data is allocated exclusively for that particular call. This guarantees that the bandwidth is available whenever the call provides data at the maximum burst amount. For every call subscribing to committed data, new separate bandwidth is allocated on the trunk line as the call sets up.

In many networks, however, a large number of frame relay calls which subscribe to positive CIR do not send data constantly at that rate, so the trunk bandwidth allocated for that call goes unused at times. Thus, it is more efficient for a network to allow these calls to share resources by using the same trunk bandwidth for more than one call.

This is the whole thrust of the oversubscription feature of the present invention. The oversubscription feature allows the network supervisor to optimize its trunk utilization by allocating the same bandwidth to more than one subscriber at a time. Note that the oversubscription feature does not try to allocate less bandwidth than a particular call's committed rate specifies, but instead re-allocating the same bandwidth to another call. Instead, it relies on the notion that it has been statistically shown that calls with non-zero CIR do not usually send data at the full maximum amount at the same time. Committed data transported using shared trunk bandwidth is termed statistically committed data.

The oversubscription feature can be explained using an analogy with the airline industry. Over time, statistics have shown in the airline industry that for those reserving an unrestricted seat there is some predictable percentage who will not show up for the flight. If an airline takes only one reservation for every one seat, then because of the no-shows the airline will fly with a less than full plane. Therefore, to better utilize the planes, flights are systematically overbooked based on the assumption that not all passengers will show up. Oversubscribing bandwidth on trunk lines of the present invention is similar in concept to overbooking seats on a flight. While it acknowledges that any call will sometimes send its maximum amount of committed data, it presupposes that not all calls will send their maximum amount of data at the same time.

For overbooking a flight, the challenge is to correctly identify the number of people who will make a reservation but not show up. It is not necessary to identify which people won't show, but only how many. If the airline overbooks by too few, there will be empty seats. If the airline overbooks by too many, there will be more people than can get on the plane. In that case, some people will get "bumped". So too with oversubscription, the challenge is to correctly identify the number of calls that will not send data simultaneously for long periods. If traffic is oversubscribed too little, there will be unused bandwidth of the trunks. However, if traffic is oversubscribed too much, there will be more committed data arriving than can fit on the trunk and some of this committed data will be "bumped".

When calling for an airline reservation, the airline simply commits to providing a seat for the passenger. The airline does not inform the passenger if the flight is overbooked. As long as the passenger gets a seat when he does show up for the flight, the passenger is satisfied. Similarly, when a user subscribes to a certain CIR the user may not be told by the network provider that the trunk lines are oversubscribed. As long as the network meets its commitment to transport and deliver the subscriber's committed data (which it statistically will if the network is correctly dimensioned), then how this is done is of no concern to the subscriber. Like the occasional passenger that gets bumped from a flight, when a subscriber's committed data is discarded because of oversubscription, they may need to be "accommodated".

The probability of discarding statistically committed data may be high or low. Just how high or low the probability of discard is for statistically committed data will vary among networks. It depends on how well the network can predict its traffic utilization, but it is likely higher than the probability of loss for committed data without oversubscription. The goal is to keep the probability of loss within an acceptable limit.

2. Controlled Oversubscription Terminology

When the network supervisor may choose to use the oversubscription feature of the frame relay node, the network supervisor can configure the frame relay network in a controlled fashion. For each permanent virtual connection configured, the network supervisor can program the network management system 12 by specifying what portion, if any, of the subscriber's committed data is to be considered for oversubscription.

According to Frame Relay standards, the committed burst amount signifies the maximum amount of committed data the subscriber can send to (and receive from) the network. This principle still holds when oversubscription of trunks is in use, or not. On access to (from) the network, the perspective of what constitutes committed data (versus what constitutes excess data) remains consistent with the standards and the subscriber's contract. Inside the frame relay network, however, a portion of the subscriber's committed burst amount can be assigned exclusive trunk bandwidth while another portion can be assigned shared trunk bandwidth. When configuring a permanent virtual connection, the amount of the subscriber's committed data for which the network assigns exclusive trunk bandwidth is configured simply as the committed burst amount (Bc), and the amount for which the network assigns shared trunk bandwidth is configured as the statistically committed burst amount (Bcs).

For the purposes of this discussion, the use of the parameter Bc in the context of network trunks is not the same as the Frame Relay standards use of the parameter Bc at the network access. However, their values will be equal when the associated Bcs value is configured for zero. Herein, the parameter Bc refers to the committed burst amount within the network, i.e., on the trunk lines. The subscriber's committed burst amount at the network access is actually represented by the sum of Bc and Bcs.

Note that if a subscriber call is known to have a traffic pattern which does not lend itself to sharing bandwidth, then it should be configured for Bcs equal to zero.

3. User Calls and Network Overhead Calls

Not all Frame Relay permanent virtual connections in a network are for subscriber traffic. Some calls are set up to transfer information such as configuration and accounting data between a frame relay node 14, 16, 18, 20 and the Network Management System 12. This type of call is referred to as a "network overhead call" or simply as a "network call," as opposed to the normal subscriber call which is termed a "user call." Within the frame relay node 14, 16, 18, 20, these calls are terminated using software known in the art as the Internal Subscriber Service program.

Like user calls, network calls are eligible to be configured with statistically committed data. The allocation scheme for trunk bandwidth is exactly the same for user calls and network calls. However, because of the differences in data flow requirements for network and user traffic, trunk bandwidth is not shared between user calls and network calls when oversubscribing. That is, the trunk bandwidth oversubscribed for the user call is not re-allocated to a network call, and vice versa.

4. Data Tagging and Discarding Data

As committed data enters the frame relay network, it is tagged by the first frame relay node to receive the data as Bc or Bcs. Excess data entering the network is tagged as Be. In addition, all data is marked as belonging to either a user call or a network overhead call. For data sent from the frame relay access devices 22, 24, . . . , 32 the frame relay node 16 will tag the data. For data sent from the frame relay access devices 34, 36, . . . , 44 the frame relay node 20 will tag the data.

Note that this tagging does not affect the setting of the Discard Eligible (DE) bit in the frame. The DE bit is passed through the frame relay network and delivered to the destination undisturbed.

The reason for this tagging of data is to attach some level of importance to the frame of data. This importance level is used when the frame relay network is in a congestion situation and frames need to be discarded. Frames are dropped in the frame relay network according to a least important to most important scheme. When the frame relay network first starts to become congested, the least important data is dropped. As the level of congestion increases, the importance of the data being discarded increases as well. The following is the progressive order, from least important to most important, by which frames are discarded as the network congestion increases.

Be data from network and/or user calls (no distinction between network and user calls)

Be data from network and/or user calls + Bcs data from network calls

Be data from network and/or user calls + Bcs data from network calls + Bcs data from user calls Be data from network and/or user calls + Bcs data from network calls + Bcs data from user calls + Bc data from user calls Be data from network and/or user calls + Bcs data from network calls + Bcs data from user calls + Bc data from user calls + Bc data from network calls (i.e. all data)

5. Configuration Parameters Governing Frame Relay Bandwidth Usage

Section 5 herein sets forth a number of configuration parameters at both the trunk service port and connection levels, which are used to control the oversubscription feature.

For completeness, parameters controlling bandwidth allocation for excess data are described below as well.

Trunk service port parameters are signalled from the network management system 12 to the frame relay nodes 14, 16, 18, 20. Connection level parameters are signalled from the network management system 12 to the frame relay nodes 16 and 20. Frame relay nodes 16 and 20 then pass the connection level parameters to the frame relay nodes 14 and 18 in a connection control signal during connection establishment. Sections 5.1, 5.1.1, . . . , 5.1.7 describe in more detail the trunk parameters that are included in the frame relay oversubscription trunk and connection parameter signals from the network management system 12. Sections 5.2, 5.2.1, . . . , 5.2.5 describe in more detail the connection level parameters that are included in the frame relay oversubscription trunk and connection parameter signals.

5.1 Frame Relay Trunk Service Port Parameters

Some types of physical lines, e.g. DS1 and E1, may be defined into one or more channels. Each channel is treated as if it were logically a separate line. Some types of physical lines may not be subdivided. The term service port is used to erase the unnecessary distinction between physical lines and logical lines.

These parameters are configured for each individual Frame Relay trunk service port.

5.1.1 The Bandwidth Allocation Threshold (BAT)

The bandwidth allocation threshold for the service port defines the absolute maximum that will ever be allocated on that service port, regardless if the allocation is for committed, statistically committed or excess data. It is specified as a percentage of the total bandwidth of that service port.

The values for parameters the maximum bandwidth for user Bcs (Max_bw_Bcs_user), the maximum bandwidth for network Bcs (Max_bw_Bcs_network), and the maximum bandwidth for excess data (Max_bw_Be) must be less than or equal to the value of BAT.

5.1.2 The Maximum Bandwidth for User Bcs Traffic

The parameter for the maximum bandwidth for User Bcs traffic (Max_bw_Bcs_user) limits the maximum amount of the service port's bandwidth to be allocated for statistically committed data of user calls. It is specified as a percentage of the total bandwidth of that service port.

No bandwidth is initially reserved for statistically committed data of user calls, but this sets the upper limit of what may be selectively allocated if needed.

The value chosen cannot exceed the value chosen for BAT. Setting a value less than BAT implies some bandwidth will be held back for other types of traffic. Setting a value of zero implies this service port cannot be used for user calls within statistically committed data.

5.1.3 The Maximum Bandwidth for Network Bcs Traffic

The parameter for the maximum bandwidth for network Bcs traffic (Max_bw_Bcs_network) limits the maximum amount of the service port's bandwidth to be allocated for statistically committed data of network calls. The maximum bandwidth for network Bcs traffic (Max_bw_Bcs_network) is specified as a percentage of the total bandwidth of that service port.

No bandwidth is initially reserved for statistically committed data of network calls, but this sets the upper limit of what may be selectively allocated if needed.

The value chosen cannot exceed the value chosen for BAT. Setting a value less than BAT implies some bandwidth will be held back for other types of traffic. Setting a value of zero implies this service port cannot be used for network call with statistically committed data.

5.1.4 The Maximum Bandwidth for Be Traffic

The parameter for the maximum bandwidth for excess data (Max_bw_Be) limits the maximum amount of the service port's bandwidth to be allocated for excess data of user or network calls. The maximum bandwidth for excess data (Max_bw_Be) is specified as a percentage of the total bandwidth of that service port.

No bandwidth is initially reserved for excess data, but this sets the upper limit of what may be selectively if needed.

The value chosen cannot exceed the value chosen for BAT. Setting a value less than BAT implies some bandwidth will be held back for other types of traffic. Setting a value of zero implies this service port cannot be used for calls with excess data.

5.1.5 The Number of Times Over Subscribe Bcs—User

Trunk bandwidth is allocated and reallocated at an amount equal to a call's maximum amount of statistically committed data.

This indicates the maximum number of times the same bandwidth can be allocated on that service port for statistically committed data of user calls.

Setting the value to 1 implies no oversubscription will occur. In this case, the allocation is the same as for regular committed data except that the limit of the parameter Max_bw_Bcs_user is imposed.

5.1.6 The Number of Times Over Subscribe Bcs—Network

Trunk bandwidth is allocated and reallocated at an amount equal to a call's maximum amount of statistically committed data.

This indicates the maximum number of times the same bandwidth can be allocated on that service port for statistically committed data of network calls.

Setting the value to 1 implies no oversubscription will occur. In this case the allocation is the same for regular committed data except that the limit of the parameter Max_bw_Bcs_network is imposed.

5.1.7 The Number of Times Over Subscribe Be

The parameter for the maximum bandwidth for excess data (Max_bw_Be) is used to calculate the amount of bandwidth allocated for a user or network call's excess data. The allocation amount is computed as a function of Be/Over_be.

It is noted that excess data is not normally oversubscribed in the same fashion as committed data. For example, trunk bandwidth is not (generally) allocated at an amount equal to a call's maximum amount of excess data, but rather at an amount equal to some portion of a call's maximum amount of excess data.

Setting the value to 1 implies that bandwidth is fully allocated the same as for committed data, except that the limit of the parameter Max_bw_Be is imposed.

5.2 Frame Relay Permanent Virtual Connection Parameters

These parameters are configured for each individual Frame Relay PVC. There are actually two of EACH parameter: one for the data flow in one direction, and one for the data flow in the opposite direction.

5.2.1 Type of Call

This parameter identifies the call as either a user call or a network overhead call.

5.2.2 Bc

The parameter Bc is the maximum burst amount of committed data a subscriber might send for which exclusive trunk bandwidth is allocated. The trunk bandwidth is allocated at the same amount as the parameter Bc.

Bc along with Bcs defines the subscriber's total maximum committed data amount.

5.2.3 Bcs

Bcs is the maximum burst amount of committed data a subscriber might send for which shared trunk bandwidth is allocated. The trunk bandwidth is allocated and reallocated at the same amount as the parameter for the maximum burst amount Bcs.

The parameters Bcs along with Bc defines the subscriber's total maximum committed data amount.

5.2.4 The Maximum Burst Amount of Excess Data (Be)

The parameter Be is the maximum burst amount of excess data a subscriber might send. Trunk bandwidth is allocated at some portion of the Be amount.

5.2.5 The Committed Information Rate (CIR)

The total committed burst amount taken over some limited time period defines the throughput rate for committed data, or committed information rate.

The time period for committed data is defined by the parameter Tc. It is not specifically configured but is calculated from the values chosen for Bc, Bcs and CIR. The parameter Tc is computed as from the equation (Bc +Bcs)/CIR and must be between 0.25 and 1.50 seconds. If the parameter CIR is chosen to be zero, then the parameter Tc is set to 1 second.

6.0 Thorough Network Traffic Analysis Needed

In order to take full advantage of the present invention, the traffic in the frame relay network must be thoroughly analyzed prior to utilizing the oversubscription feature, because improper dimensioning of the oversubscription parameters can cause undue congestion problems in a network, resulting in excessive data loss.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the invention is intended to be claimed in a regular utility application to cover all of the generic and specific features of the invention herein described, and all statements of the scope of the invention which, as a matter of language, might be said to fall therebetween.

What is claimed is:

1. A frame relay network having a network management system coupled to at least two frame relay nodes connected by a trunk line having a total bandwidth for carrying multiple subscriber data, wherein the improvement comprises:

the network management system providing frame relay oversubscription trunk and connection parameter signals to the frame relay nodes that contain information about how to allocate and selectively oversubscribe the total bandwidth of the trunk line connecting the at least two frame relay nodes in order to share the same bandwidth with multiple subscribers at a time.

2. A frame relay network according to claim 1, wherein the network management system comprises microprocessor circuitry having a combination of a microprocessor, a random access memory, a read only memory, an input/output device and an address, control and data bus for connecting the combination.

3. A frame relay network according to claim 1, wherein the network management system includes a graphical user interface program for receiving the frame relay oversubscription trunk parameters from a network supervisor.

4. A frame relay network according to claim 1, wherein one frame relay node is connected to another frame relay node by an oversubscribed trunk for accommodating oversubscribed virtual connections.

5. A frame relay network according to claim 1, wherein one frame relay node is connected to another frame relay node by a trunk for accommodating non-oversubscribed virtual connections between the frame relay nodes.

6. A frame relay network according to claim 1, wherein each frame relay node includes a node control board and one or more frame relay line interface boards, and a control bus for connecting the node control board to the one or more frame relay line interface boards.

7. A frame relay network according to claim 6, wherein the node control board comprises microprocessor circuitry having a combination of a microprocessor, a random access memory, a read only memory, an input/output device and an address, control and data bus for connecting the combination.

8. A frame relay network according to claim 6, wherein the node control board provides frame relay oversubscription trunk and connection parameter to the one or more frame relay line interface boards.

9. A frame relay network according to claim 6, wherein the one or more frame relay line interface boards includes either a frame relay low speed line interface board, a frame relay medium speed line interface board, a frame relay high speed line interface board, or any combination thereof.

10. A frame relay network according to claim 9, wherein the frame relay network includes a data bus for connecting either the frame relay low speed line interface board, the frame relay medium speed line interface board, a frame relay high speed line interface board, or the combination thereof.

11. A frame relay network according to claim 6, wherein the one or more frame relay line interface boards provide monitoring information containing information about the current trunk utilization, including the current levels of data traffic for an exclusive committed data maximum burst, a shared committed data maximum burst, an excess committed data maximum burst, a total committed burst, or any combination thereof.

12. A frame relay network according to claim 11, wherein the node control board provides the monitoring information back to the network management system.

13. A frame relay network according to claim 1, wherein the frame relay network further comprises frame relay access device nodes, each connected to a respective frame relay node by a subscriber line for providing subscriber data.

14. A frame relay network according to claim 13, wherein each frame relay access device node includes a device such as either a router, a personal computer server, or a host computer; and wherein each frame relay access device node is connected to a respective frame relay node by a subscriber line for providing subscriber data.

15. A frame relay network according to claim 1, wherein the frame relay oversubscription trunk and connection parameter signals contain information about how to allocate the bandwidth of trunk lines connecting one or more of the frame relay nodes, including trunk parameter information about either a bandwidth allocation threshold, a user statistically committed data bandwidth threshold, a network statistically committed data bandwidth threshold, an excess data bandwidth threshold, an oversubscribed user statistically committed data factor, an oversubscribed network statistically committed data factor, an oversubscribed excess data factor, or any combination thereof.

16. A frame relay network according to claim 1, wherein the frame relay oversubscription trunk and connection parameter signals contain information about the bandwidth needs of individual virtual connections between the frame relay nodes, including connection parameter information about either an exclusive committed data maximum burst amount, a shared committed data maximum burst amount, an excess committed data maximum burst amount, a total committed burst rate, or any combination thereof.

17. A frame relay network according to claim 1, wherein the frame relay nodes respond to the frame relay oversubscription trunk and connection parameter signals, for providing a frame relay oversubscription connection control signal from one frame relay node to another frame relay node depending on the frame relay oversubscription trunk and connection parameter signals.

* * * * *